United States Patent [19]

Bahr et al.

[11] Patent Number: 5,167,022
[45] Date of Patent: Nov. 24, 1992

[54] MULTIPROCESSOR BUS LOCKING SYSTEM WITH A WINNING PROCESSOR BROADCASTING AN OWNERSHIP SIGNAL CAUSING ALL PROCESSORS TO HALT THEIR REQUESTS

[75] Inventors: Richard G. Bahr, Cambridge; Andrew Milia, Burlington; Barry J. Flahive, Westford, all of Mass.

[73] Assignee: Hewlett-Packard Company, Palo Alto, Calif.

[21] Appl. No.: 552,341

[22] Filed: Jul. 16, 1990

Related U.S. Application Data

[63] Continuation of Ser. No. 262,475, Oct. 25, 1988, abandoned.

[51] Int. Cl.⁵ .................... G06F 13/36; G06F 13/368
[52] U.S. Cl. .................... 395/325; 395/725; 364/935.41; 364/935.43; 364/935.4; 364/940.2; 364/DIG. 1; 364/229.2; 364/240.1; 364/240.4; 364/242.6; 364/242.92; 340/825.5
[58] Field of Search ... 364/200 MS File, 900 MS File; 340/825.5; 395/325, 725

[56] References Cited

U.S. PATENT DOCUMENTS

| 4,212,080 | 7/1980 | Milliken | 364/900 |
|---|---|---|---|
| 4,214,304 | 7/1980 | Shimizu et al. | 364/200 |
| 4,480,304 | 10/1984 | Carr et al. | 364/200 |
| 4,554,628 | 11/1985 | Bell | 364/200 |
| 4,574,350 | 3/1986 | Starr | 364/200 |
| 4,586,128 | 4/1986 | DeWoskin | 364/200 |
| 4,620,278 | 10/1986 | Ellsworth et al. | 364/200 |
| 4,622,630 | 11/1986 | Vora et al. | 364/900 |
| 4,698,753 | 10/1987 | Hubbins et al. | 364/200 |
| 4,818,985 | 4/1989 | Ikeda | 340/825.5 |
| 4,908,749 | 3/1990 | Marshall et al. | 364/200 |
| 4,987,529 | 1/1991 | Craft et al. | 364/200 |
| 5,065,153 | 11/1991 | Tomita et al. | 340/825.5 |

FOREIGN PATENT DOCUMENTS

| 30130593 | 1/1985 | European Pat. Off. |
| 2044499A | 10/1980 | United Kingdom |
| 2188177A | 9/1987 | United Kingdom |

Primary Examiner—Thomas C. Lee
Assistant Examiner—Paul Harrity

[57] ABSTRACT

A method and apparatus for granting, to a select processor in a multiprocessor computing system, exclusive access to a bus for issuance of address, data and command signals thereover, wherein each processor includes bus lock request and bus lock assert elements which provide corresponding bus request and bus hold signals which are recognized by corresponding elements included in other processors connected to the bus. The bus lock according to the present invention assures the processor having lock status of privacy on the bus necessary to complete a specified operation without interruption from the other processors.

4 Claims, 4 Drawing Sheets

MULTIPROCESSOR BUS LOCKING SYSTEM WITH A WINNING PROCESSOR BROADCASTING AN OWNERSHIP SIGNAL CAUSING ALL PROCESSORS TO HALT THEIR REQUESTS

This application is a continuation of U.S. patent application Ser. No. 262,475, filed Oct. 25, 1988, now abandoned.

FIELD OF INVENTION

The present invention relates to multiprocessor computing systems having processor interlocks, in particular to multiprocessor computing systems having fair access to exclusion locks.

BACKGROUND OF THE INVENTION

A multiprocessor computing system requires a manner of granting, to one processor at a time, exclusive access to protected resources. In a bus-based multiprocessor, a frequent approach is to augment the system bus protocol. This approach is popular because the system bus must already have a method of arbitrating among the processors, requiring only the expression of arbitration commands through the instruction set.

A variation on this bus access technique is to allow a "winning" processor to stop all other bus activity until that processor is finished with its accesses. This approach certainly provides the basis for mutual exclusion, but in inhibiting all bus activity, the approach can significantly degrade system performance. This can be compensated for somewhat by permitting only the simplest of actions while arbitration is frozen: for example, "test and set". A second disadvantage of this approach is that only one lock can exist at a time.

More sophisticated locking techniques use the bus arbitration protocol only as a means of allowing one contender at a time access to a "lock" resource that, once secured, cannot be acquired by a second processor. In other words, the bus arbitration mechanism is only the doorway to the resource lock, and there may actually be multiple locks, each securing a different resource.

If there is to be a system bus lock that ca be held by only one processor at a time, the natural question is how to ensure fairness in the competition for acquiring the lock. One method is to rely upon the basic fairness of the bus' primary arbitration method. However, this approach has two shortcomings. The first is that securing the bus may not necessarily assure securing the lock. This can result in significant bus time wasted in lock acquisition retries. The second shortcoming is that because the bus lock holding period may extend over many bus arbitration cycles, any fairness guarantees that the primary bus arbitration protocol can offer has been lost. One manner of solving both these problems is to use a random and infrequent retry.

SUMMARY OF THE INVENTION

The method and apparatus of the invention provides a multiprocessor system having a deterministic fair access to mutual exclusion (mutex) locks upon a common pathway to memory referred to as the system bus.

As previously mentioned, this protocol is deterministic. This protocol avoids wasting bus bandwidth on lock acquisition retry by simply preventing processors from requesting the bus while a lock is held. This protocol achieves fairness in obtaining locks by requiring previous lock holders to defer to subsequent requestors. This deference to the subsequent requestors guarantees that no one processor may iteratively reacquire a bus lock without allowing others an opportunity.

BRIEF DESCRIPTION OF THE DRAWINGS

These and other features of the present invention will be better understood by reading the following detailed description taken together with the drawings, wherein.

DETAILED DESCRIPTION OF THE INVENTION

Figure 1:
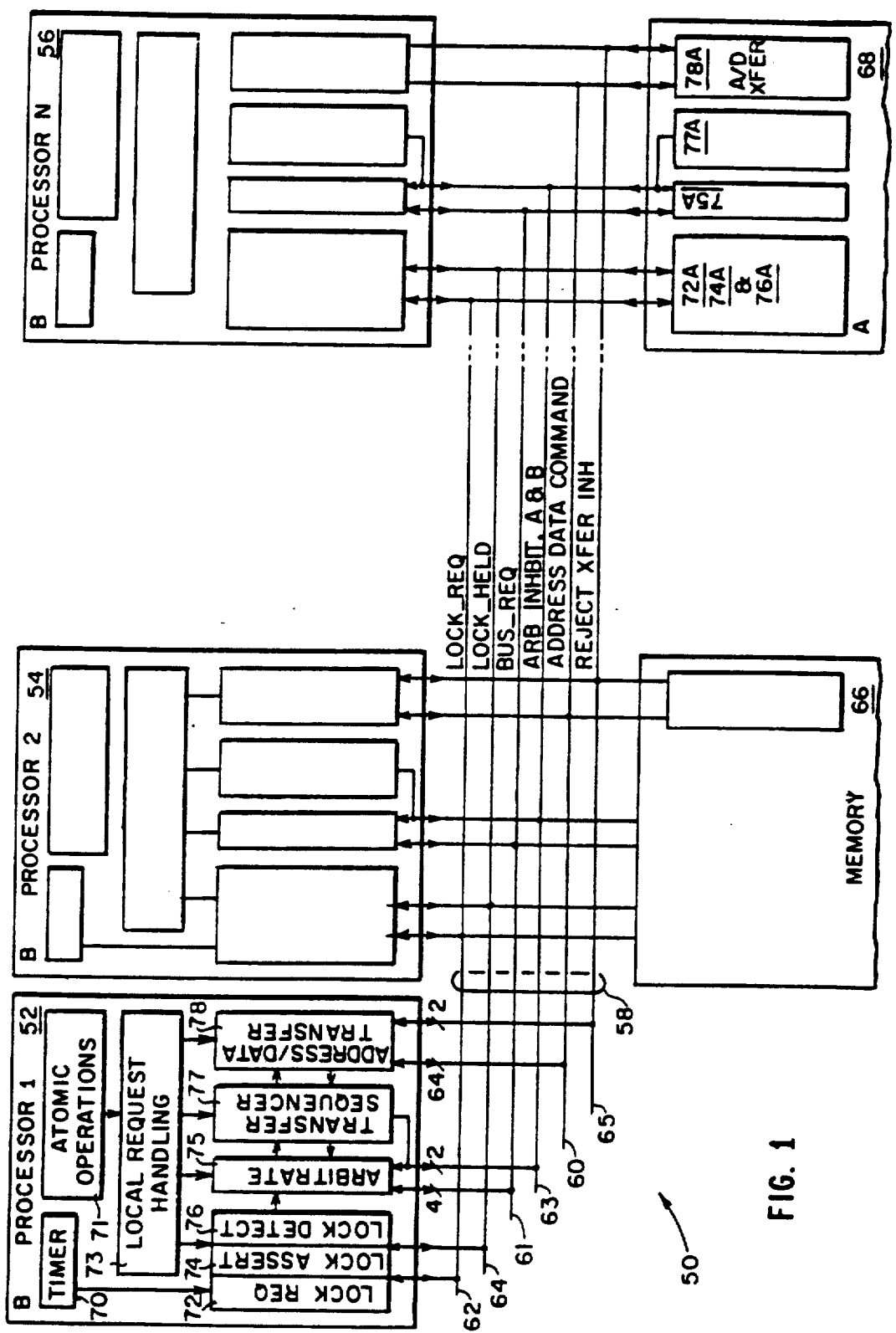
FIG. 1 is a block diagram of an exemplary embodiment including a plurality of processors connected to a bus for access to a common memory.

As shown in FIG. 1, two system bus 58 signals are dedicated to each mutex lock to which the processors 52, 54 and 56 have access. The first signal on lead 64 called LOCK_HELD is asserted (e.g. by element 72) whenever the affiliated mutex lock is held. The second signal on lead 62 called LOCK_REQUEST is asserted typically whenever one of the processors that does not currently hold the affiliated lock, desires it. The signals are assumed to be in a logical or connected or fashion and driven directly by each of the processors 52, 54 and 56. The corresponding exempt instruction code technique used to initiate a mutex lock is provided in U.S. patent application Ser. No. 07/262,495, entitled METHOD AND APPARATUS FOR BUS LOCK DURING ATOMIC COMPUTER OPERATIONS, filed concurrently herewith and incorporated by reference.

The protocol of the signal provides that whenever a processor, e.g. 52, wants to secure a mutex lock, and both the affiliated LOCK_HELD and LOCK_REQUEST signals are unasserted, that processor is the sole unit which bids for the bus. If the processor 52 secures the bus, and the LOCK_HELD signal is still not asserted, that processor may assert the LOCK_HELD signal using element 74 and be assured that it then is the exclusive holder of the lock. Once a processor (52) has asserted LOCK_HELD, it must cause its element 72 to deassert LOCK_REQUEST and commence data or instruction exchange via the address and data transfer element 78 and address and data leads 60.

Implementations having heavily overlapped bus arbitration protocols may result in the reporting of the lock acquisition by one processor when it is too late to stop another processor from winning the bus. In that event, the winning processor may be "surprised" to find the LOCK_HELD signal asserted after winning the bus. In this overlapped protocol environment, the processors include instruction and execution logic to back up and try again as though the first attempt never took place. Such processor logic and techniques are discussed in copending applications U.S. patent application Ser. No. 07/259,345 entitled CENTRAL PROCESSOR CONDITION CODE METHOD AND APPARATUS, FILED Oct. 18, 1988 and U.S. patent application Ser. No. 07/259,793 now abandoned entitled METHOD AND APPARATUS FOR EXCEPTION HANDLING IN PIPELINE PROCESSORS HAVING MISMATCHED INSTRUCTION PIPELINE DEPTHS, filed Oct. 19, 1988, incorporated by reference. The present invention avoids this problem by having the locking processor block bidding for bus until it is certain that all other lock contenders have seen the assertion of LOCK_HELD and withdrawn their arbitration bids.

The protocol also provides that whenever a processor wants to secure a mutex lock, and the affiliated LOCK_HELD signal is deasserted, but the LOCK_REQUEST signal is asserted by element 72, the action taken depends upon whether the processor had previously held the lock during the interval of time in which LOCK_REQUEST has been uninterruptively asserted. If the processor had not, it proceeds to bid for the bus by asserting a the LOCK_REQUEST signal. The processor continues to assert LOCK_REQUEST until it succeeds in securing the lock, i.e., in asserting LOCK_HELD. If however, the processor had held the lock during that time, it refrains from bidding for the bus until the LOCK_REQUEST signal is deasserted. The function of lock detector element 76 is discussed in the hereinbefore referenced application entitled METHOD AND APPARATUS FOR BUS LOCK DURING ATOMIC COMPUTER OPERATIONS. It is provided, in pertinent part, in the referenced application, that "When a . . . lock is initiated by a particular instruction . . . the processor 52 causes a lock detector 76 to determine if there existed a prior lock held signal. If so, the processor 52 is inhibited. If not, the processor 52 arbitrates for control of the bus according to arbitration techniques including those known in the art."

Furthermore, whenever a processor 52 wants to secure a mutex lock, such as a during atomic operation, and the affiliated LOCK_HELD signal is asserted, that processor refrains from bidding for the bus. Subsequently, if the LOCK_REQUEST signal is not asserted, or if the processor had not previously held the lock during the interval of time in which LOCK_REQUEST has been uninterruptively asserted, the processor will assert the affiliated LOCK_REQUEST and continue to do so until it succeeds in acquiring the lock or has lost interest in doing so. Secondly, if the LOCK_REQUEST signal is asserted, and the processor had previously held the lock during the interval of time in which LOCK_REQUEST has been uninterruptively asserted, the processor will just wait until the LOCK_REQUEST signal is again deasserted. It may vie for the lock at that time.

A processor that wishes to release a mutex lock may do so at any time simply by deasserting the affiliated LOCK_HELD signal.

Some alternate embodiments having pipelined bus protocols may result in busy retry of memory operations. In an environment such as this, if the unlock is intended to accompany a memory 66 transaction, then the LOCK_HELD signal should not be deasserted until the memory operation is certain to complete, or certain to fail.

The present invention provides several steps to be taken for deadlock avoidance. The nested acquisition of the same lock by same processor simply proceed. Also, if a processor may successively acquires a number of locks, there is a specified ordering of the locks, and the locks are always acquired strictly in that order. Moreover, if a processor is currently holding a lock, it begins a lock duration limit timer. If that timer expires before the lock is released, all locks are automatically abandoned and the owning processor interrupted. The duration of the timer is set to several times the maximum interval that a lock, or succession of locks, might be held in a normally functioning system.

Figure 2:
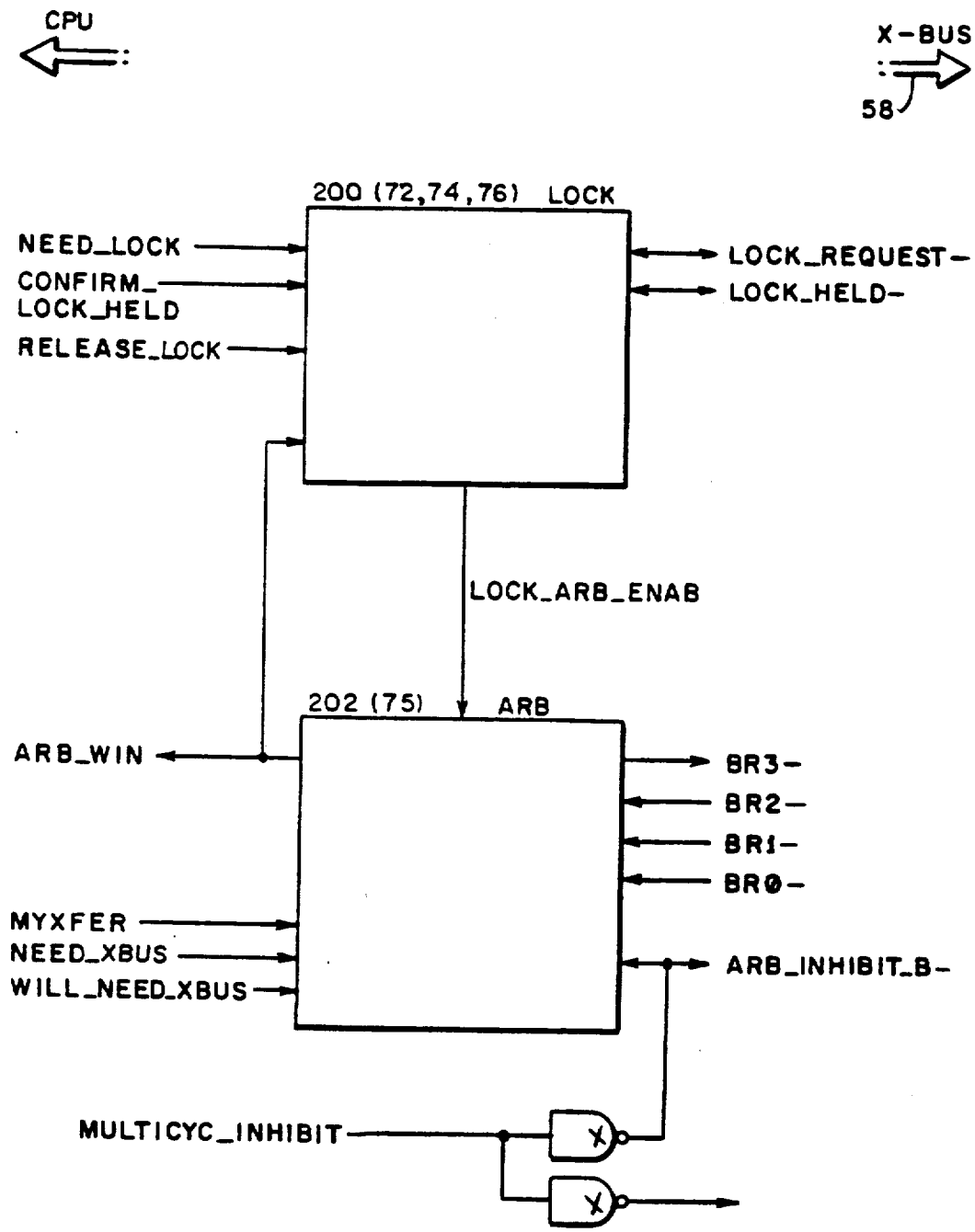
FIG. 2 is a block diagram of the interconnection of one embodiment of the lock acquisition and bus arbitration blocks of the bus interface.

As shown in FIG. 2, the arbitration and lock control blocks of the bus interface attach to both the system's bus 58, and the processor's local request generation logic 73. A brief glossary of the signals generated or received by the local request generation logic follows:

NEED_LOCK is asserted to identify that the next processor read to be serviced requires the acquisition of the bus lock.

CONFIRM_LOCK_HELD is asserted to identify that the processor "read and lock" which just took place has been properly acknowledged on the bus. This signal handles the situation that a bus operation may fail to complete successfully even though arbitration succeeds.

RELEASE_LOCK is asserted when the processor wishes to abandon the bus lock. The processor chooses to do so when a "read and unlock" or "write and unlock" operation has been properly acknowledged on the bus. The processor may also choose to do so if there has been a local error such as lock holding duration timeout.

ARB_WIN is asserted by the bus arbitration logic 75 when the processor has been awarded the right to transfer on the bus 58.

MYXFER is asserted by the address/data transfer logic 78 of the bus interface when an address or data transfer is underway.

NEED_XBUS is asserted by the processor when there is a pending and unserviced processor read or write.

WILL_NEED_XBUS is asserted by the processor when there "will be" a pending read and unserviced read or write in the next cycle. The advance warning of the need for service permits the early assertion of a bus request signal.

MULTICYC_INHIBIT is asserted by the address-/data transfer logic when a request is underway that requires the sustained and uninterrupted use of the bus.

Also as shown in FIG. 2, there are a number of bus control signals involved in the locking and arbitration protocol. A glossary follows:

LOCK_REQUEST- (62) is asserted by a processor when it wishes access to the bus lock and is not blocked from acquiring the lock for fairness reasons.

LOCK_HELD- (64) is asserted by processor when it holds the bus lock.

BR3-, BR2-, BR1- and BR0- (61) are the four bus request lines that correspond to the respectively numbered processors.

ARB_INHIBIT_B- (63B) is asserted when the "B" level bus requestors are to be inhibited from arbitrating for the bus.

ARB_INHIBIT_A- (63A) is asserted when the "A" level bus requestors are to be inhibited from arbitrating for the bus.

The signal LOCK_ARB_ENAB is asserted and driven by the lock acquisition and request block 200 (72, 74, 76) and provided to the bus arbitration block 202 (75) to indicate that a processor request may proceed.

Figure 3:
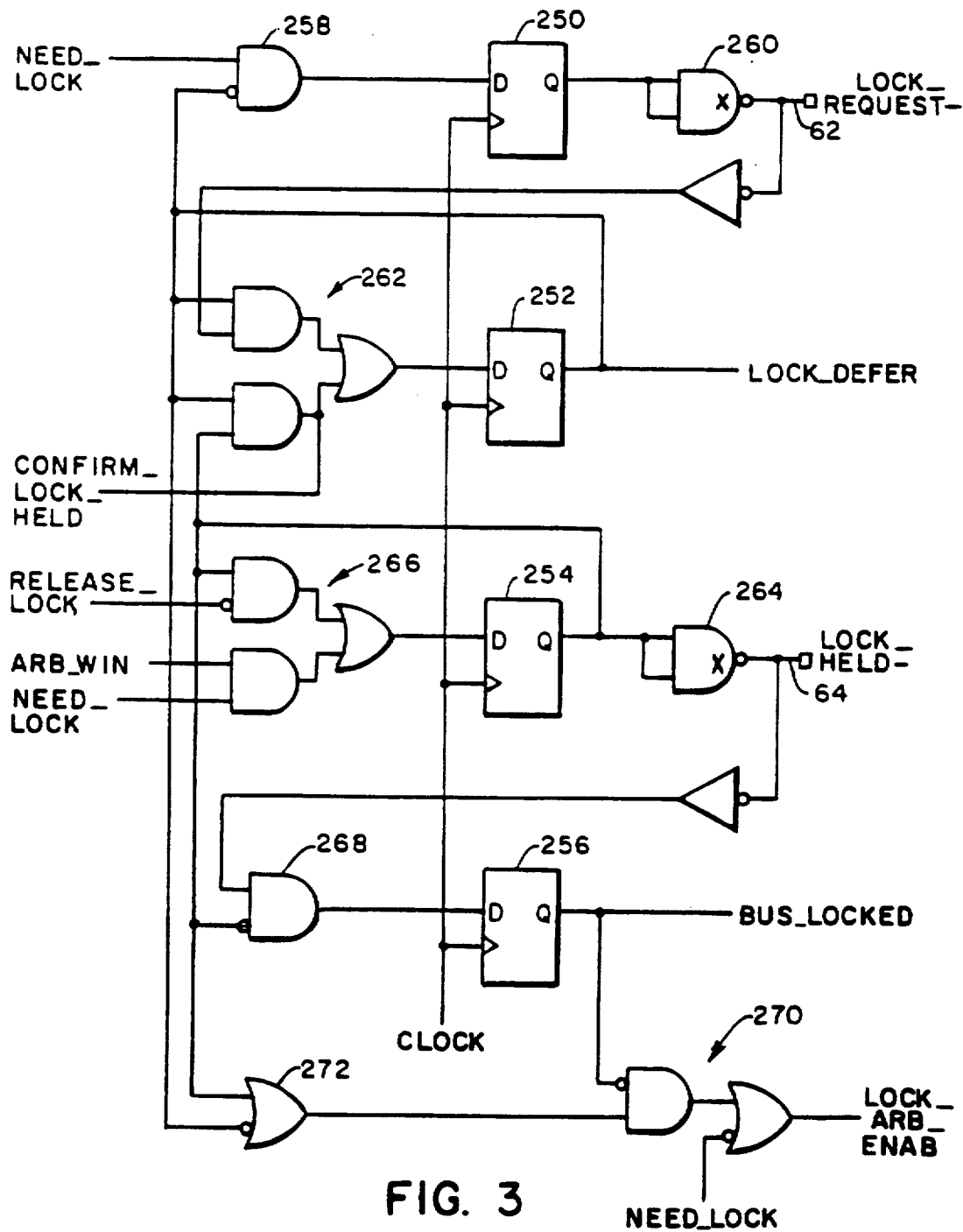
FIG. 3 is a schematic diagram having further detail of the lock acquisition and requesting blocks 74 and 72 of the embodiment of FIGS. 1 and 2.

The lock arbitration and request block is shown in more detail in FIG. 3. There are four state elements: 250, 252, 254 and 256, which help to drive and interpret the bus control signals LOCK_REQUEST- and LOCK_HELD-. When the processor requires a bus lock, it indicates the need by asserting the signal NEED_LOCK. NEED_LOCK will cause the state element 250 to be set if not prevented from doing so by state element 252 via gate 258. If state element 250 is set, gate 260 will drive the open collector signal LOCK_REQUEST- on the backplane. NEED_LOCK is assumed to be deasserted when the processor has been granted access to the bus so that the request is withdrawn at the correct time. State element 252 blocks the assertion of LOCK_REQUEST- if this processor had once held the bus lock during the duration of time when LOCK_REQUEST- has been uninterruptively asserted, providing the basis for the fairness in the acquisition of the bus lock. LOCK_DEFER precludes this processor from asserting the LOCK_REQUEST- signal, as well as preventing this processor from acquiring the bus as described in the next paragraph. This LOCK_DEFER situation as recorded in 252 is set when the CONFIRM_LOCK_HELD signal is presented to gate 262. Gate 262 also sustains the LOCK_DEFER situation for the duration of the assertion by this processor of LOCK_HELD by state element 254 and/or for the uninterrupted assertion of the external LOCK_REQUEST- signal. The open collector signal LOCK_HELD- is driven by gate 264 whenever state element 254 is set. The state element 254 is set when the processor is awarded the bus, i.e., ARB_WIN is asserted, and the processor needs the bus lock, i.e., NEED_LOCK is asserted. Gate 266 determines this. Gate 266 also sustains the lock holding until the RELEASE_LOCK signal is presented by the processor. State element 256 is set whenever the bus is locked for access by another processor. Gate 268 determines this situation by noting that the LOCK_HELD- signal is asserted, but the local lock holding state element 254 is not set When 256 is set, a lock-requiring processor read cannot be allowed to proceed. This determination is made by the combination of the gates 270 and 272 and presented to the bus arbitration logic in the signal LOCK_ARB_ENAB. LOCK_ARB_ENAB is always set when the processor does not need the bus lock, i.e., NEED_LOCK is deasserted. Alternatively, LOCK_ARB_ENAB is set when the bus is not locked, i.e., state element 256 is not set and either of two conditions prevail according to gate 272. The first condition is simply that this processor already holds the bus lock, i.e., state element 254 is set. The second condition is that there is no lock acquisition fairness deference in effect, i.e., LOCK_DEFER driven by state element 252 is not asserted.

Figure 4:
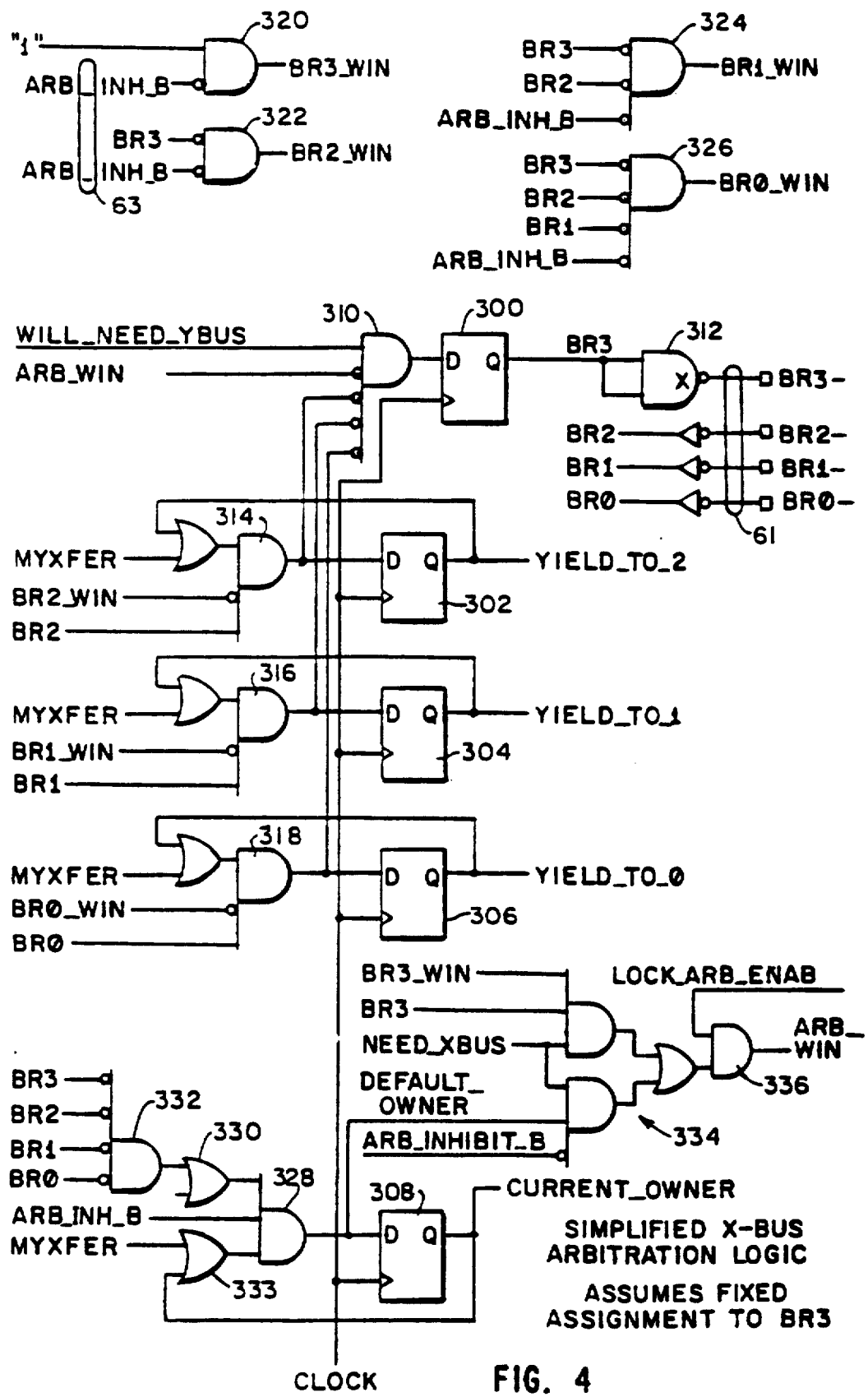
FIG. 4 further detail of the bus arbitration block 75 of the bus interface of the embodiment of FIGS. 1 and 2.

The bus arbitration and request block is shown in more detail in FIG. 4. For purposes of simplicity, this block is drawn as if the processor was permanently affixed to bus request level 3. In the actual implementation, additional logic is present to permit the processor to request at any level and can be provided according to the detail of FIG. 4. Also, the current implementation supports only four requestors, but there is no fundamental restriction in this number and a greater or lesser number may be accommodated. In the discussion to follow, "B level requestors" and "processors (52, 54, 56)" are to be considered synonymous. However, in other implementation that need not be so.

In FIG. 4, there are five state elements: 300, 302, 304, 306 and 308, which help to drive and interpret the five bus control signals 61 BR3-, BR2-, BR1-, BR0 and AR-B_INHIBIT_B-. State element 300 is the bus request flipflop. State elements 302, 304 and 306 sample and hold the state of the other processor bus request signals to be used in the fairness deference algorithm of this processor. State element 308 is the record of whether this processor is the default owner of the bus.

Gates 320, 322, 324 and 326 determine if one of the four processors may secure the bus in the next cycle. BR0_WIN is asserted by gate 326 if all higher priority requests (BR3, BR2 and BR1) are not asserted, and B level request arbitration is not inhibited, i.e., ARB_INHIBIT_B is not asserted. Similarly, BR1_WIN is asserted by gate 324, BR2_WIN by gate 322, and BR3_WIN by gate 320. The processor associated with request level three can only fail to win the bus if ARB_INHIBIT_B is asserted. ARB_INHIBIT_B- is asserted on the bus, by this processor or others, for one of two reasons. The first reason is that the current transfer requires multiple uninterrupted bus cycles. In that case, both ARB_INHIBIT_B- and ARB_INHIBIT_A- are driven by the address/data transfer block 78 to suspend all new arbitration for the bus. The second reason is that an "A" level requester wishes access to that bus. If any "A level device requests the bus, that bus interface must also drive the signal ARB_INHIBIT_B- to suspend all "B" level device arbitration. In this manner, "A" level devices are assured total priority over "B" level ones.

The bus request flipflop 300 is set when the processor wishes to use the bus, i.e., WILL_NEED_BUS is asserted, and the processor has not just secured the use of the bus, i.e., ARB_WIN is not asserted, and the processor is not deferring to any of the other three processors. This combination of events is determined by gate 310. Once flipflop 300 is set, gate 312 unconditionally drives the bus signal BR3- so that other processors may decide arbitration as well. Bus request deference is in effect if any of the three signals driven by gates 314, 316 or 318 are asserted. Conceptually, these gates are asserted if the associated bus request signal is currently asserted and the requestor will not be serviced next, or if the associated bus request signal had been asserted when this processor had last transferred on the bus and there has been no service granted since that time. Specifically, gate 314, for example, will be asserted if BR2 is asserted and BR2 will not be granted the bus in the next cycle, i.e., BR2_WIN is not asserted, and one of two conditions prevail. The first condition is that the current bus cycle is owned by this processor, i.e., MYXFER is asserted. The second is that the state element 302 is set. The state element 302 is set if the condition of BR2 asserted and BR2_WIN not asserted was true at the time of the last bus operation by this processor. This combination of conditions assures that a processor will not reacquire the bus twice in succession without all other processor bus requestors having an opportunity to do so as well.

State element 308, CURRENT_OWNER, is set when this processor is the last one to transfer on the bus and the element remains set until another "B" level requestor acquires the bus. Specifically, gate 328 will allow the element to be set if it is already set or the current transfer belongs to this processor as decide by gate 333) and no other processor will acquire the bus in the next cycle. Other processors may not acquire the bus either because ARB_INHIBIT_B is asserted or because no other processor is requesting the bus. These events are combined in gate 330, with gate 332 detecting the absence of other "B" level requests.

Finally, ARB_WIN is asserted if this processor is granted access to the bus in the next cycle. Gate 336 drives the signal if there i the lock acquisition and request blocks 74 and 72 drive the LOCK_ARB_ENAB signal and the processor otherwise is awarded the bus. This qualification assures that a processor will not get access to a locked bus if the processor also requires lock acquisition. Gate 334 decides whether the processor is otherwise awarded the bus. The processor may be so awarded for two reasons. In the first case, it is awarded the bus if the bus is needed (NEED_BUS), the associated bus request line is asserted (BR3), and the bus prioritization logic says there is no higher priority requester (BR3_WIN). The second situation is the one of default ownership. Again, the bus must be needed (NEED_BUS), there must be no ARB_INHIBIT_B. In effect, and this processor is the default owner as already decided by gate 328. Gate 334 combines all of these events.

Further details relating to bus arbitration and bus structures are provided in U.S. patent application Ser. No. 07/262,574; now U.S. Pat. No. 4,979,099, entitled QUASI-FAIR BUS ARBITRATION SCHEME WITH DEFAULT OWNER SPEEDUP, filed concurrently herewith and incorporated by reference. Moreover, modifications and substitutions of the above exemplary embodiment made by one skilled in the art are considered to be within the scope of the present invention, which is not to be limited, except by the claims which follow.

We claim:

1. For use in a multiprocessor computer system having a bus for data and instruction transfer, and at least one requestable resource connected to said bus, a bus lock system comprising:

within each processor, request means connected to said bus for requesting a bus lock permitting mutually exclusive transfer on said bus;

within each processor, possession means connected to said bus for generating a signal that indicates winning and possession of said bus lock by processor a upon winning said bus lock;

within each processor, detection means connected to said bus and responsive to said possession means, for receiving and detecting said signal that indicates winning and possession of said bus lock by a processor other than itself;

within each processor, halting means connected to said bus and to said possession means and responsive to said signal that indicates winning and possession of said bus lock, for halting activity of that processor's corresponding request means upon winning said bus lock and for initiating data and instruction transfer on said bus within each processor prevention means connected to and responsive to said halting means and said detection means for preventing processors other than a winning processor from requesting said bus lock until respective detection means of all processors other than the winning processor have detected possession of said bus lock by said winning processor and halted all activity of their respective request means;

wherein said bus lock permitting mutually exclusive transfers on said bus is obtained by a processor having a respective request means being de-asserted upon occurrence of a respective signal that indicates winning and possession of said bus lock as received by a respective detection means, and wherein said bus lock is released upon de-assertion of said respective signal that indicates winning and possession of said bus lock as received by detection means of other processors on said bus.

2. The apparatus of claim 1, wherein whenever a processor must gain possession of a bus lock that is not currently held by any processor, and the request means of at least one other processor is also requesting access to said lock, and if said processor was not previously in possession of the lock while the request means of a processor other than itself was uninterruptively asserted, the request means of said processor requests access to said bus lock until it wins the lock, or if said processor was previously in possession of the lock while the request means of a processor other than itself was uninterruptively asserted, the request means of said processor will refrain from requesting access to the lock until the request means of the other processor terminates its request for the lock.

3. The apparatus of claim 1, each processor further comprising a lock duration timer, connected to said possession means, and which is activated upon possession of said bus lock and runs for a selected period, whereupon said timer interrupts said processor and whereupon said processor liberates said bus lock.

4. The apparatus of claim 1 wherein each processor in requesting said at least one requestable resource has available a plurality of bus lock intervals which are available according to a specified order, and wherein a processor can only acquire said bus lock intervals according to said specified order.

* * * * *